United States Patent
Goodworth

(10) Patent No.: US 10,669,004 B2
(45) Date of Patent: Jun. 2, 2020

(54) CRASH ENERGY ATTENUATION SYSTEM FOR A TRANSMISSION SUPPORT IN A VERTICAL LIFT AIRCRAFT

(71) Applicant: Sikorsky Aircraft Corporation, Stratford, CT (US)

(72) Inventor: Alan R. Goodworth, Oxford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 391 days.

(21) Appl. No.: 15/474,634

(22) Filed: Mar. 30, 2017

(65) Prior Publication Data
US 2018/0281918 A1 Oct. 4, 2018

(51) Int. Cl.
| | | |
|---|---|---|
| B64C 1/06 | (2006.01) | |
| B64C 27/00 | (2006.01) | |
| B64C 27/12 | (2006.01) | |
| B64C 27/10 | (2006.01) | |

(52) U.S. Cl.
CPC .......... B64C 1/062 (2013.01); B64C 27/006 (2013.01); B64C 27/12 (2013.01); B64C 27/10 (2013.01); B64C 2027/002 (2013.01)

(58) Field of Classification Search
CPC .............................. B64C 1/062; B64C 27/006
See application file for complete search history.

(56) References Cited

U.S. PATENT DOCUMENTS

| | | | | |
|---|---|---|---|---|
| 3,493,082 A | * | 2/1970 | Bell | B64C 25/001 188/377 |
| 4,361,212 A | * | 11/1982 | Bolang | F16F 7/121 188/377 |
| 4,815,678 A | * | 3/1989 | Gawne | B64C 25/00 244/100 R |
| 5,154,371 A | * | 10/1992 | Grant | B64C 27/12 244/17.27 |
| 7,198,224 B2 | | 4/2007 | Townsend et al. | |
| 2006/0243854 A1 | * | 11/2006 | Townsend | B64C 27/006 244/17.11 |
| 2012/0006934 A1 | * | 1/2012 | Prud'Homme-Lacroix | B64C 27/006 244/17.27 |
| 2018/0050794 A1 | * | 2/2018 | Bolukbasi | B64D 11/0619 |

* cited by examiner

*Primary Examiner* — Philip J Bonzell
*Assistant Examiner* — Tye William Abell
(74) *Attorney, Agent, or Firm* — Cantor Colburn LLP

(57) ABSTRACT

A vertical take-off and landing (VTOL) aircraft includes an airframe having a transverse axis and a longitudinal axis that is substantially perpendicular relative to the transverse axis. A transmission and rotor support platform is arranged in the airframe. A transmission is supported by the transmission and rotor support platform. An energy attenuation system mechanically links the transmission and rotor support platform with the airframe. The energy attenuation system includes a first plurality of collapsible support members selectively facilitating rotation of the transmission and rotor support platform about the transverse axis and a second plurality of collapsible support members, the first and second pluralities of support members selectively facilitating translation of the transmission and rotor support platform along an axis that is substantially parallel to the rotor axis.

15 Claims, 3 Drawing Sheets

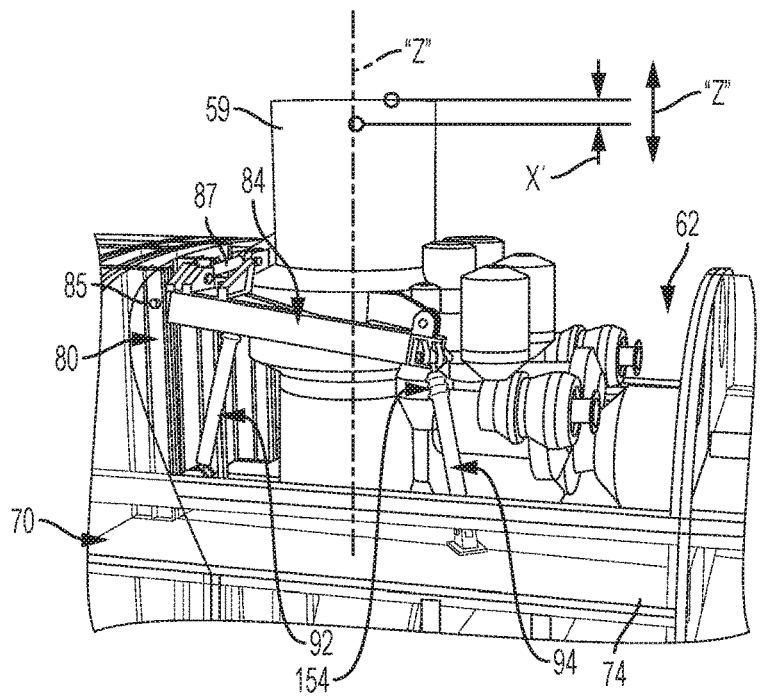
FIG. 4
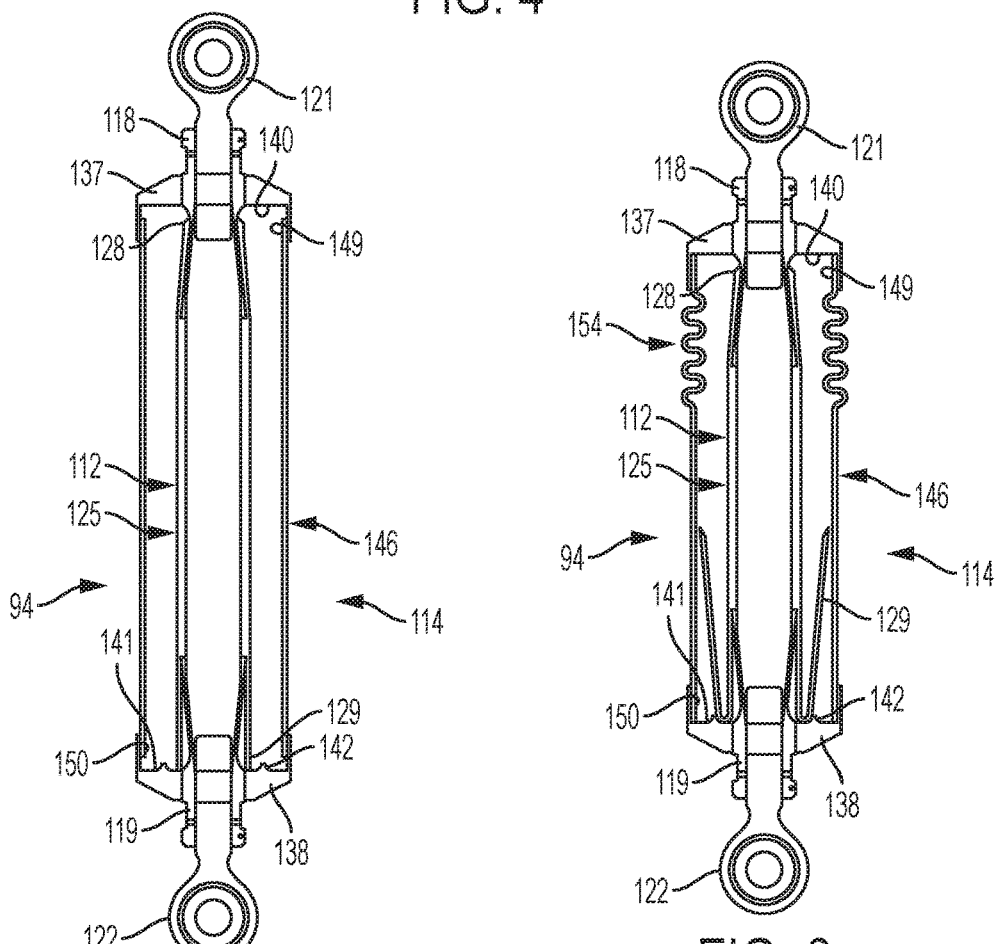
FIG. 5
FIG. 6

CRASH ENERGY ATTENUATION SYSTEM FOR A TRANSMISSION SUPPORT IN A VERTICAL LIFT AIRCRAFT

STATEMENT OF FEDERAL SUPPORT

This invention was made with Government support under Contract No. W911W6-16-2-0017 awarded by Department of the Army. The Government has certain rights in the invention.

BACKGROUND

Exemplary embodiments pertain to the art of vertical take-off and landing (VTOL) aircraft and, more particularly, to a crash energy attenuation system for a transmission support in a VTOL aircraft.

Occasionally, aircraft may experience a high velocity landing that may exceed normal landing gear energy absorbing thresholds. Accordingly, many aircraft include an energy attenuation system that provides a level of protection from undesirable forces to protect crew and airframe components. Specifically, many vertical take-off and landing (VTOL) aircraft include stroking or energy attenuating seats that reduced forces perceived by aircrew and passengers, and/or energy absorbing structure that protects aircrew and passengers from loss of occupiable space as well as potential penetration of high mass components into aircrew and passenger spaces.

BRIEF DESCRIPTION

Disclosed is a vertical take-off and landing (VTOL) aircraft including an airframe having a transverse axis and a longitudinal axis that is substantially perpendicular relative to the transverse axis. A transmission and rotor support platform is arranged in the airframe. A transmission is supported by the transmission and rotor support platform. A rotor system is mechanically connected to the transmission. The rotor system includes a plurality of rotor blades rotatable about a rotor axis that is substantially perpendicular to the transverse axis and the longitudinal axis. An energy attenuation system mechanically links the transmission and rotor support platform with the airframe. The energy attenuation system includes a first plurality of collapsible support members selectively facilitating rotation of the transmission and rotor support platform about the transverse axis and a second plurality of collapsible support members, the first and second pluralities of support members selectively facilitating translation of the transmission and rotor support platform along an axis that is substantially parallel to the rotor axis.

In addition to one or more of the features described above or below, or as an alternative, further embodiments could include wherein each of at least one of the first plurality of collapsible support members and the second plurality of collapsible support members includes a first collapsible element and a second collapsible element covering the first collapsible element.

In addition to one or more of the features described above or below, or as an alternative, further embodiments could include wherein the first collapsible element includes a first collapsible portion from a first material selected to yield upon exposure to a first loading force and the second collapsible element includes a second collapsible portion formed from a second material selected to yield at a second loading force that is greater than the first loading force.

In addition to one or more of the features described above or below, or as an alternative, further embodiments could include wherein the first material comprises carbon and the second material comprises aluminum.

In addition to one or more of the features described above or below, or as an alternative, further embodiments could include wherein the second collapsible element includes a first end cap, a second end cap, the second collapsible portion extending between the first end cap and the second end cap, at least one of the first end cap and the second end cap including a feature configured to guide the first collapsible portion radially outwardly during a loading event exceeding the first loading force.

In addition to one or more of the features described above or below, or as an alternative, further embodiments could include wherein the second collapsible element includes a first end cap including a first inner surface, a second end cap including a second inner surface, the second collapsible portion including a first end coupled to the first end cap spaced from the first inner surface.

In addition to one or more of the features described above or below, or as an alternative, further embodiments could include wherein the second collapsible portion includes a second end that is spaced from the second inner surface.

In addition to one or more of the features described above or below, or as an alternative, further embodiments could include a plurality of energy attenuating lateral supports mechanically connecting the transmission and the transmission and rotor support platform.

Also disclosed is a method of attenuating energy during loading event experienced by a vertical take-off and landing (VTOL) aircraft. The method includes rotating a transmission and rotor support platform about a transverse axis of the VTOL aircraft upon exposure of the VTOL aircraft to a loading event, and translating the transmission and rotor support platform along an axis that is substantially perpendicular to the transverse axis.

In addition to one or more of the features described above or below, or as an alternative, further embodiments could include wherein at least one of rotating the transmission and rotor support platform about the transverse axis and translating the transmission and support member along the axis that is substantially perpendicular to the transverse axis includes collapsing a first plurality of collapsible support members each including a first collapsible portion and a second collapsible portion arranged radially outwardly of the first collapsible portion.

In addition to one or more of the features described above or below, or as an alternative, further embodiments could include wherein collapsing the first plurality of collapsible support members includes collapsing the second collapsible portion after at least partially collapsing the first collapsible portion.

In addition to one or more of the features described above or below, or as an alternative, further embodiments could include wherein collapsing the first collapsible portion includes directing the first collapsible portion radially outwardly and upwardly.

In addition to one or more of the features described above or below, or as an alternative, further embodiments could include wherein collapsing the second collapsible portion includes creating one or more folds in the second collapsible portion.

In addition to one or more of the features described above or below, or as an alternative, further embodiments could include wherein translating the transmission and rotor support platform along the axis that is substantially perpendicular to the transverse axis includes collapsing one or more lateral support members mechanically connecting a transmission with the transmission and rotor support platform.

In addition to one or more of the features described above or below, or as an alternative, further embodiments could include wherein translating the transmission and rotor support platform along the axis that is substantially perpendicular to the transverse axis includes translating the transmission and rotor support platform along an axis that is substantially parallel to a main rotor axis of the VTOL aircraft.

BRIEF DESCRIPTION OF THE DRAWINGS

The following descriptions should not be considered limiting in any way. With reference to the accompanying drawings, like elements are numbered alike:

FIG. 4 depicts a second portion of the response by the energy attenuation system to the undesirable loading, in accordance with an exemplary embodiment;

FIG. 5 depicts a collapsible support member of the energy attenuating system, in accordance with an exemplary embodiment; and FIG. 6 depicts the collapsible support member of FIG. 5 following exposure to an undesirable loading, in accordance with an exemplary embodiment.

DETAILED DESCRIPTION

A detailed description of one or more embodiments of the disclosed apparatus and method are presented herein by way of exemplification and not limitation with reference to the Figures.

Figure 1:
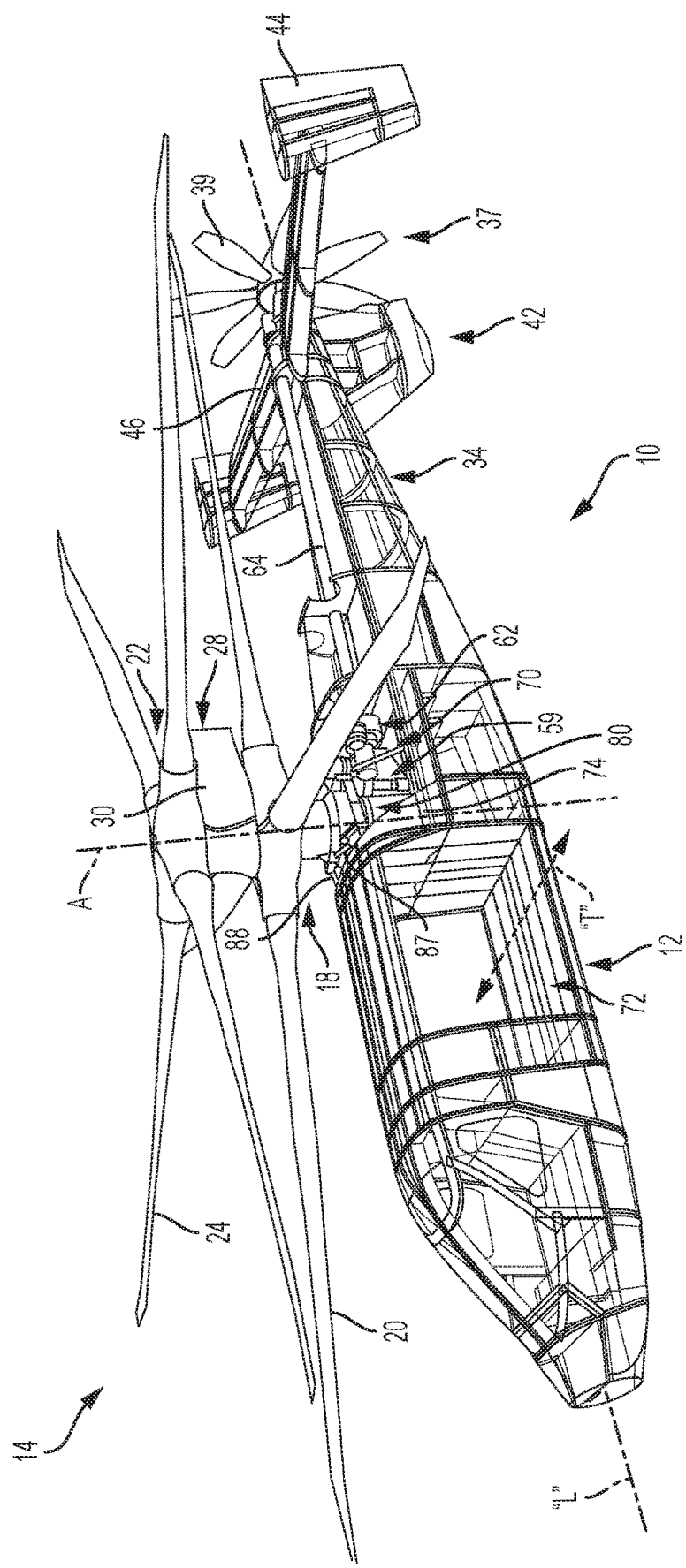
FIG. 1 depicts a partially dissembled view of a vertical take-off and landing (VTOL) aircraft including an energy attenuation system, in accordance with an exemplary embodiment.

A vertical take-off and landing (VTOL) aircraft or rotary wing aircraft, in accordance with an exemplary embodiment, is indicated generally at 10 in FIG. 1. VTOL aircraft 10 includes an airframe 12 having a main rotor assembly 14. Main rotor assembly 14 may include a first rotor system 18 having a first plurality of rotor blades 20 and a second rotor system 22 having a second plurality of rotor blades 24. A fairing 28 including an aerodynamic profile 30 may be arranged between first rotor system 18 and second rotor system 22. First and second rotor systems 18 and 22 rotate about a main rotor axis "A". While shown as a dual rotor aircraft, it should be understood that VTOL aircraft 10 may include a single main rotor system.

VTOL aircraft 10 is further shown to include an extending tail 34 that defines a longitudinal axis "L". Extending tail 34 supports a tail rotor system 37 including a plurality of tail rotor blades 39. Tail rotor system 37 provides forward thrust for VTOL aircraft 10. It is to be understood that tail rotor system 37 may also be arranged to provide transverse thrust. Extending tail 34 is further shown to include a number of flight control surfaces 42 including rudders, one of which is indicated at 44, and stabilizers, one of which is indicated at 46.

Airframe 12 supports one or more prime movers (engines) (not shown) operatively coupled to a transmission 59 through a gear box 62. Transmission 59 is mechanically linked to first and second rotor systems 18 and 22 through a main rotor shaft (not separately labeled) and to tail rotor system 37 through a tail rotor shaft 64. Airframe 12 includes an upper deck 70 arranged aft of a passenger compartment 72 and, in the exemplary embodiment shown, above a fuel cell (not shown). Upper deck 70 defines a transmission and rotor support platform 74 that supports an energy attenuating transmission support system 80. Energy attenuating transmission support system 80 provides support to transmission 59 and main rotor assembly 14. In the event of a hard landing, VTOL aircraft 10 may experience undesirably high dynamic loads which may be greater than those typically experienced during touchdown. Energy attenuating transmission support system 80 reduces these dynamic loads in order to protect passengers, crew, and the fuel cell from undesirable contact with high mass components such as transmission 59 and main rotor assembly 14.

Figure 2:
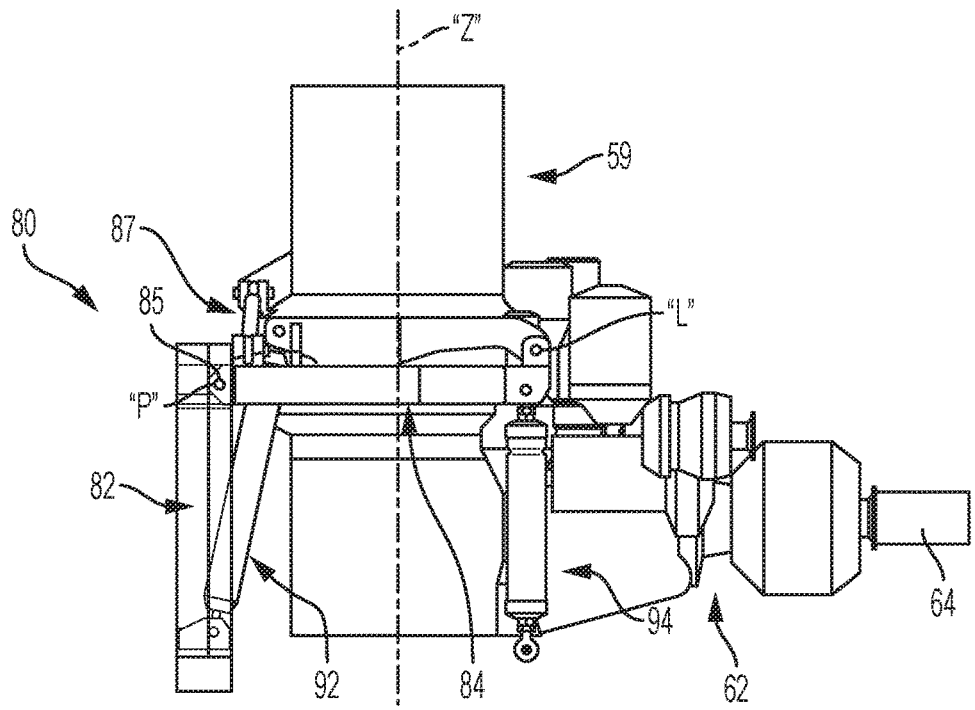
FIG. 2 depicts the energy attenuation system of FIG. 1 supporting a transmission of the VTOL aircraft, in accordance with an exemplary embodiment.

In accordance with an exemplary embodiment illustrated in FIG. 2, energy attenuating transmission support system 80 includes a first plurality of support members, one of which is indicated at 82 and a second plurality of support members, one of which is indicated at 84. First plurality of support members 82 project upwardly from transmission and rotor support platform 74 and extend along an axis that is substantially parallel to main rotor axis "A". Second plurality of support members 84 are connected to corresponding ones of first plurality of support members 82 through a pivot or hinge 85 that defines a pivot axis "P". Second plurality of support members 84 project along an axis that may be substantially parallel to longitudinal axis "L".

Figure 3:
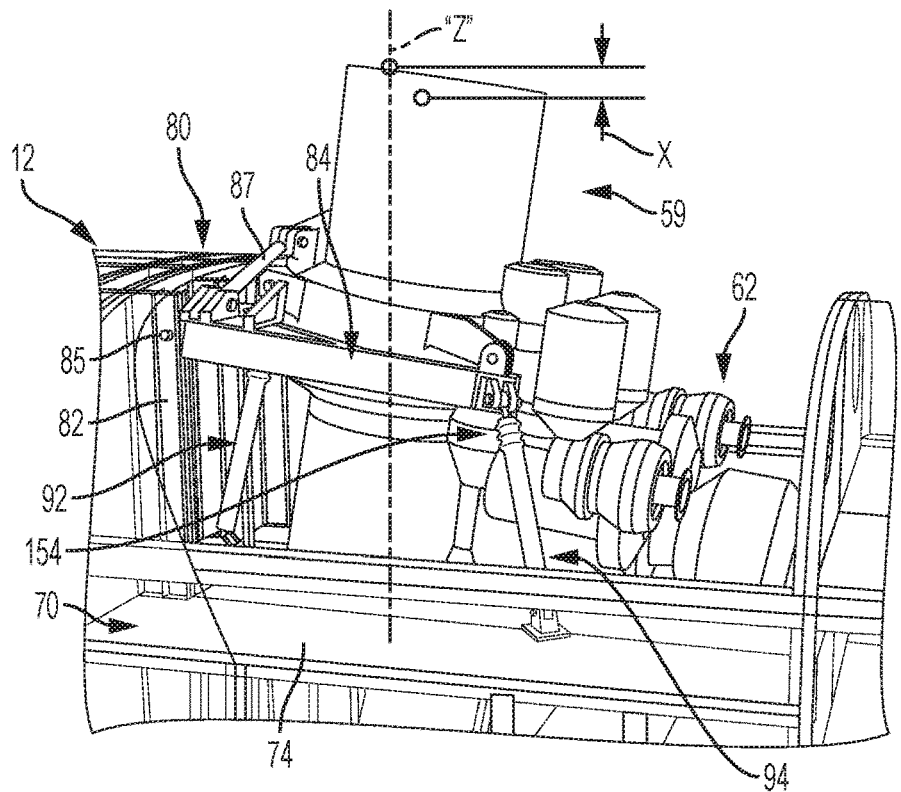
FIG. 3 depicts a first portion of response by the energy attenuation system to an undesirable loading, in accordance with an exemplary embodiment.

In further accordance with an aspect of an exemplary embodiment, energy attenuating transmission support system 80 may include a pair of energy attenuating lateral supports 87 and 88 (see also FIG. 1). Energy attenuating lateral supports 87, 88 connect transmission 59 with the second plurality of support members 84. Energy attenuating lateral supports 87, 88 restrict movement of transmission 59 along a transverse axis "T" of VTOL aircraft 10. Upon experiencing crash forces that exceed selected limits, energy attenuating lateral supports 87, 88 allow translation of transmission 59 along the axis that is substantially parallel to main rotor axis "A" a distance "X" as shown in FIG. 3. It is to be understood that the number and connection points of energy attenuating lateral supports 87 and 88 may vary.

In still further accordance with an exemplary aspect, energy attenuating transmission support system 80 also includes a first plurality of collapsible support members 92 and a second plurality of collapsible support members 94. As will be detailed below, first and second pluralities of collapsible support members 92 and 94 allow transmission 59 to pivot about pivot axes "P" and "L" as shown in FIG. 3, and translate along a translational axis "Z" a selected distance "X'", as shown in FIG. 4 in order to absorb energy from undesirable loading that may occur during a crash. That is, the first and second pluralities of support members 92 and 94 constitute dual axis support mechanism (not separately labeled) that may facilitate substantially simultaneous rotation about pivot axis "P" and rotation about pivot axis "L" resulting in a substantially pure vertical displacement X' of transmission 59 along axis "Z". The dual axis support mechanism laterally and longitudinally restrains transmission 59, while allowing for vertical translation. That is, the dual axis support mechanism allows first and second pluralities of support members 92 and 94 to stroke and absorb energy.

In the exemplary embodiment shown, first plurality of collapsible support members 92 are connected to transmission and rotor support platform 74, and transmission 59. First plurality of collapsible support members 92 may extend between a lower end (not separately labeled) of corresponding ones of the first plurality of support members 82 and a support collar (not separately labeled) on transmission 59. The second plurality of collapsible support members 94 may extend between transmission and rotor support platform 74 and cantilevered ends (not separately labeled) of corresponding ones of the second plurality of support members 84.

As each of the first plurality of collapsible support members 92 and the second plurality of collapsible support members 94 may be similarly constructed, a detailed description will follow with reference to FIGS. 5 and 6 in describing one of the second plurality of collapsible support members 94 with an understanding that each of the first plurality of collapsible support member 92 may include similar structure.

In yet still further accordance with an exemplary aspect illustrated in FIG. 5, collapsible support member 94 includes a first collapsible element 112 and a second collapsible element 114. In the exemplary aspect shown, first collapsible element 112 is housed within second collapsible element 114. Further, it is to be understood that second collapsible element 114 supports normal flight loads of transmission 59 and main rotor assembly 14 without collapsing. Collapse occurs once VTOL aircraft 10 is exposed to higher crash forces.

First collapsible element 112 includes a first end 118 and a second, opposing end 119. First end 118 includes a first connector 121 and second end 119 includes a second connector 122. First and second connectors 121 and 122 are connectable to second support member 84 and structure, such as transmission and rotor support platform 74, in VTOL aircraft 10. First collapsible element 112 includes a first collapsible portion 125 having a first end portion 128 and a second, opposing end portion 129. Second end portion 129 is bonded to second end 119 with a less resilient bond than first end portion 128 is bonded to first end 118. In this manner, first collapsible element 112 is designed to possess a particular failure mode at a selected loading. First collapsible portion 125 is formed from a material that is designed to yield at a first selected loading pressure. In accordance with an aspect of an exemplary embodiment, first collapsible portion 125 comprises carbon. It is to be understood however that the particular material employed to form first collapsible portion 125 may vary and may depend upon the first selected loading pressure.

Second collapsible element 114 includes a first end cap 137 and a second end cap 138. First end cap 137 includes a first inner surface 140 and second end cap 138 includes a second inner surface 141 having a feature 142 that is receptive to second end portion 129 of first collapsible portion 125. Feature 142 is created to direct second end portion 129 radially outwardly and upwardly when VTOL aircraft 10 experiences dynamic loads that exceed selected thresholds such as those associated with hard or crash landings. When experiencing high dynamic loads, second end portion 129 travels upwardly and first end 118 translates toward second end 119.

Second collapsible element 114 also includes a second collapsible portion 146 having a first end section 149 received in first end cap 137 and a second end section 150 received by second end cap 138. Second collapsible portion 146 is formed from a material designed to yield at a second selected loading pressure that may be greater than the first selected loading pressure. In accordance with an aspect of an exemplary embodiment, second collapsible portion 146 may be formed from aluminum.

First end section 149 is spaced from first inner surface 140 at a first selected distance. Similarly, second end section 150 may be spaced from second inner surface 141 at a second selected distance. In this manner, second collapsible portion 146 does not experience axial loading during normal flight operations. However, when exposed to high dynamic forces, such as during a crash landing, second collapsible portion 146 develops a crush zone 154 in which one or more folds may be formed. In this manner, each collapsible support element may provide desired support during normal flight operations while yielding at a selected loading force(s) in order to absorb undesirable forces on airframe 14. For example, first collapsible portion 125. That is, each first collapsible portion 125 may be designed to support normal flight loading and react to hard landing loading events up to about 10 G without failure. First collapsible portion 125 may react, e.g., yield such that second end portion 129 may detach from second end 119 upon experiencing a crash loading event at about 15 G and second collapsible portion 146 may react, e.g., yield at crash loading events at about 20 G.

During a crash landing that exceeds a selected load threshold, energy attenuating lateral support members 87, 88 and the first plurality of collapsible members 92 yield allowing transmission 59 to translate along the "Z" axis and second collapsible support members 94 yield promoting rotation of transmission 59 about pivot axis "P". In this manner, energy from the crash may be absorbed by energy attenuating transmission support system 80 such that high mass loads such as transmission 59 and main rotor assembly 14 shift a desired amount along two distinct axes thereby posing less of a hazard to personnel and sensitive aircraft components and enhance an overall crashworthiness of VTOL aircraft 10.

The terms "about" and "substantially" are intended to include a degree of error associated with measurement of the particular quantity based upon the equipment available at the time of filing the application. For example, "about" and/or "substantially", may include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vertical take-off and landing (VTOL) aircraft comprising:
    an airframe including a transverse axis and a longitudinal axis that is substantially perpendicular relative to the transverse axis;
    a transmission and rotor support platform arranged in the airframe;
    a transmission supported by the transmission and rotor support platform;
    a rotor system mechanically connected to the transmission, the rotor system including a plurality of rotor blades rotatable about a rotor axis that is substantially perpendicular to the transverse axis and the longitudinal axis; and
    an energy attenuation system mechanically linking the transmission and rotor support platform with the airframe, the energy attenuation system including a first plurality of collapsible support members connected to an aft portion of the rotor support platform, the first plurality of collapsible support members selectively facilitating rotation of the transmission and rotor support platform about the transverse axis and a second plurality of collapsible support members connected to a forward portion of the rotor support platform, the first and second pluralities of support members selectively substantially simultaneously collapsing thereby facilitating translation of the transmission and rotor support platform along an axis that is substantially parallel to the rotor axis.

2. The VTOL aircraft according to claim 1, further comprising: a plurality of energy attenuating lateral supports mechanically connecting the transmission and the transmission and rotor support platform.

3. The VTOL aircraft according to claim 1, wherein each of at least one of the first plurality of collapsible support members and the second plurality of collapsible support members includes a first collapsible element and a second collapsible element covering the first collapsible element.

4. The VTOL aircraft according to claim 3, wherein the first collapsible element includes a first collapsible portion from a first material selected to yield upon exposure to a first loading force and the second collapsible element includes a second collapsible portion formed from a second material selected to yield at a second loading force that is greater than the first loading force.

5. The VTOL aircraft according to claim 4, wherein the first material comprises carbon and the second material comprises aluminum.

6. The VTOL aircraft according to claim 4, wherein the second collapsible element includes a first end cap, a second end cap, the second collapsible portion extending between the first end cap and the second end cap, at least one of the first end cap and the second end cap including a feature configured to guide the first collapsible portion radially outwardly during a loading event exceeding the first loading force.

7. The VTOL aircraft according to claim 4, wherein the second collapsible element includes a first end cap including a first inner surface, a second end cap including a second inner surface, the second collapsible portion including a first end coupled to the first end cap spaced from the first inner surface.

8. The VTOL aircraft according to claim 7, wherein the second collapsible portion includes a second end that is spaced from the second inner surface.

9. A method of attenuating energy during loading event experienced by a vertical take-off and landing (VTOL) aircraft, the method comprising:
    rotating a transmission and rotor support platform about a transverse axis of the VTOL aircraft upon exposure of the VTOL aircraft to a loading event; and
    substantially simultaneously translating the transmission and rotor support platform along an axis that is substantially perpendicular to the transverse axis.

10. The method of claim 9, wherein translating the transmission and rotor support platform along the axis that is substantially perpendicular to the transverse axis includes collapsing one or more lateral support members mechanically connecting a transmission with the transmission and rotor support platform.

11. The method of claim 9, wherein translating the transmission and rotor support platform along the axis that is substantially perpendicular to the transverse axis includes translating the transmission and rotor support platform along an axis that is substantially parallel to a main rotor axis of the VTOL aircraft.

12. The method of claim 9, wherein at least one of rotating the transmission and rotor support platform about the transverse axis and translating the transmission and support member along the axis that is substantially perpendicular to the transverse axis includes collapsing a first plurality of collapsible support members each including a first collapsible portion and a second collapsible portion arranged radially outwardly of the first collapsible portion.

13. The method of claim 12, wherein collapsing the first plurality of collapsible support members includes collapsing the second collapsible portion after at least partially collapsing the first collapsible portion.

14. The method of claim 12, wherein collapsing the first collapsible portion includes directing the first collapsible portion radially outwardly and upwardly.

15. The method of claim 12, wherein collapsing the second collapsible portion includes creating one or more folds in the second collapsible portion.

\* \* \* \* \*